(12) United States Patent
Ando et al.

(10) Patent No.: US 7,452,195 B2
(45) Date of Patent: Nov. 18, 2008

(54) APPARATUS FOR PREPARATION OF AQUEOUS EMULSION FROM CURABLE SILICONE COMPOSITION AND SUSPENSION OF CURED SILICONE PARTICLES

(75) Inventors: Kazuhiko Ando, Chiba Prefecture (JP); Keiji Yoshida, Chiba Prefecture (JP); Toyohiko Yamadera, Chiba Prefecture (JP); Yoshitsugu Morita, Chiba Prefecture (JP); Mitsuo Hamada, Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 71 days.

(21) Appl. No.: 11/680,934

(22) Filed: Mar. 1, 2007

(65) Prior Publication Data
US 2007/0155893 A1 Jul. 5, 2007

Related U.S. Application Data

(62) Division of application No. 10/475,451, filed on Apr. 2, 2004, now Pat. No. 7,202,301.

(30) Foreign Application Priority Data

Apr. 26, 2001 (JP) .............................. 2001-129453
Apr. 26, 2002 (WO) ....................... PCT/JP02/04297

(51) Int. Cl.
*B29B 9/06* (2006.01)
(52) U.S. Cl. ............................................. 425/5; 425/6
(58) Field of Classification Search ..................... 425/5, 425/6
See application file for complete search history.

(56) References Cited

U.S. PATENT DOCUMENTS

| 4,742,142 | A | | 5/1988 | Shimizu et al. | |
|---|---|---|---|---|---|
| 4,743,670 | A | | 5/1988 | Yoshida et al. | |
| 5,254,294 | A | * | 10/1993 | Wunderlich et al. | 425/5 |
| 5,558,820 | A | * | 9/1996 | Nagano et al. | 425/5 |
| 6,576,023 | B2 | * | 6/2003 | Nakajima et al. | 425/6 |

FOREIGN PATENT DOCUMENTS

EP 0319982 A2 6/1989

(Continued)

*Primary Examiner*—Yogendra Gupta
*Assistant Examiner*—Thu Khanh T Nguyen
(74) *Attorney, Agent, or Firm*—Howard & Howard Attorneys, P.C.

(57) ABSTRACT

Method for preparation of an aqueous emulsion from a curable silicone composition consisting of (A) an organopolysiloxane having at least two silicon-bonded hydroxyl groups, (B) an organohydrogensiloxane, and (C) a curing catalyst, said method being characterized by (i) continuously supplying component (A), component (B) and component (C), or a mixture of components (A) and (B) and component (C) through individual inlet ports into a continuous mixer and mixing said components at a temperature not exceeding 10° C., (ii) continuously supplying the obtained mixture and (D) an aqueous solution of a surface-active agent to an emulsifier, and emulsifying the components at a temperature not exceeding 20° C. An apparatus for the preparation of an aqueous emulsion of a curable silicone composition comprising of a continuous mixer for mixing components (A) through (C), a distribution unit connected to the lower part of the mixer, and an emulsifier. Method for preparation of a suspension of cured silicone particles by allowing such emulsion to stand at room temperature, or heating the aforementioned emulsion.

4 Claims, 1 Drawing Sheet

FOREIGN PATENT DOCUMENTS

| | | |
|---|---|---|
| JP | 04017986 B4 | 3/1992 |
| JP | 02689121 B2 | 12/1997 |
| JP | 2001002786 A2 | 1/2001 |

* cited by examiner

APPARATUS FOR PREPARATION OF AQUEOUS EMULSION FROM CURABLE SILICONE COMPOSITION AND SUSPENSION OF CURED SILICONE PARTICLES

CROSS-REFERENCE TO RELATED APPLICATIONS

The present application is a divisional of Ser. No. 10/475,451, filed on Apr. 02, 2004, which claims priority to and all the advantages of International Application No. PCT/JP02/04297, filed on Apr. 26, 2002, which claims priority to and all the advantages of Japanese Patent Application No. JP2001-129453, filed on Apr. 26, 2001.

FIELD OF THE INVENTION

The present invention relates to a method for preparation of an aqueous emulsion from a curable silicone composition, to an apparatus for carrying out A method, and to a method for preparation of a suspension of cured silicone particles.

BACKGROUND AND PRIOR ART

It is known that an aqueous emulsion of a liquid curable silicone composition, comprising (A) an organopolysiloxane having at least two silicon-bonded hydroxyl groups in one molecule, (B) an organohydrogenpolysiloxane having at least two silicon-bonded hydrogen atoms in one molecule, and (C) a curing catalyst, can be used as a precursor for the preparation of silicone rubber particles (see Japanese Patent Publication (Kokoku) (hereinafter referred to merely as "Kokoku") Hei 4-17986). According to Kokoku Hei 4-17986, the aqueous emulsion is prepared by passing a silicone rubber composition consisting of components (A) through (C), with an addition of surface-active agent and water, through an emulsifier, such as a homomixer, homogenizer, colloid mill, etc., or by loading components (A) through (C) into a homogenizer, adding a surface-active agent, mixing the components, and then adding water and stirring the mixture. According to Practical Example 2 of the aforementioned publication, a mixture of a dimethylpolysiloxane having both molecular terminals capped with silicon-bonded hydroxyl groups with a methylhydrogenpolysiloxane having both molecular terminals capped with trimethylsiloxy groups is loaded into a storage tank. At the same time, a mixture of a dimethylpolysiloxane having both molecular terminals capped with silicon-bonded hydroxyl groups with dibutyltin dioctoate is loaded into another storage tank. After cooling, the mixtures are loaded into a static mixer where they are mixed together; the resulting mixture is fed to a colloid mill with simultaneous supply of water and a surface-active agent. Mixing of all the components produces an aqueous emulsion.

However, when the inventors tried to carry out the aforementioned method, they could not easily form a uniform aqueous emulsion. This is because, even after cooling, component (C) caused a condensation reaction between components (A) and (B). This reaction led either to gellation or to partial curing prior to emulsification in water.

SUMMARY OF THE INVENTION

It is an object of the present invention to provide a method for preparation of an aqueous emulsion from a curable silicone composition, an apparatus for carrying out A method, and a method for preparation of a suspension of cured silicone partides, the method being carried out without occurrence of a condensation reaction between components (A) and (B) prior to emulsification in water, as well as without gellation and partial curing prior to emulsification.

The present invention relates to:

(1) A method for preparation of an aqueous emulsion from a curable silicone composition comprising (A) an organopolysiloxane having at least two silicon-bonded hydroxyl groups in one molecule, (B) an organohydrogensiloxane having at least two silicon-bonded hydrogen atoms in one molecule, and (C) a curing catalyst, said method being characterized by (i) continuously supplying component (A), component (B) and component (C), or a mixture of components (A) and (B) and component (C) through individual inlet ports into a continuous mixer, and mixing the components at a temperature not exceeding 10° C., and then (ii) continuously supplying the obtained mixture and (D) an aqueous solution of a surface-active agent to an emulsifier, and emulsifying said obtained mixture at a temperature not exceeding 20° C.;

(2) An apparatus for preparation of an aqueous emulsion from a curable silicone composition, said apparatus comprising: a continuous mixer for mixing (A) an organopolysiloxane having at least two silicon-bonded hydroxyl groups in one molecule, (B) an organohydrogensiloxane having at least two silicon-bonded hydrogen atoms in one molecule, and (C) a curing catalyst; a distribution device, which is connected to said continuous mixer from below; consisting of an outlet die having orifices for discharging the liquid mixture of components (A), (B) and (C) from said continuous mixer in the form of threads or tapes flowing down through said orifices and a slit for discharging (D) an aqueous solution of a surface-active agent; and an emulsifier connected from below to said outlet die of said distribution device; and (3) A method for preparation of a suspension of cured silicone particles comprising the steps of: (1) continuously supplying a continuous mixer through individual inlet ports with (A) an organopolysiloxane having at least two silicon-bonded hydroxyl groups in one molecule, (B) an organohydrogensiloxane having at least two silicon-bonded hydrogen atoms in one molecule and (C) a curing catalyst, or a mixture of components (A) and (B) and component (C), and mixing the components at a temperature not exceeding 10° C., (2) continuously supplying the obtained mixture and (D) an aqueous solution of a surface-active agent to an emulsifier, and emulsifying the obtained mixture at a temperature not exceeding 20° C., and then (3) either allowing to stand or heating the aqueous emulsion of the obtained curable silicone composition.

DETAILED EXPLANATION OF THE INVENTION

Figure 1:
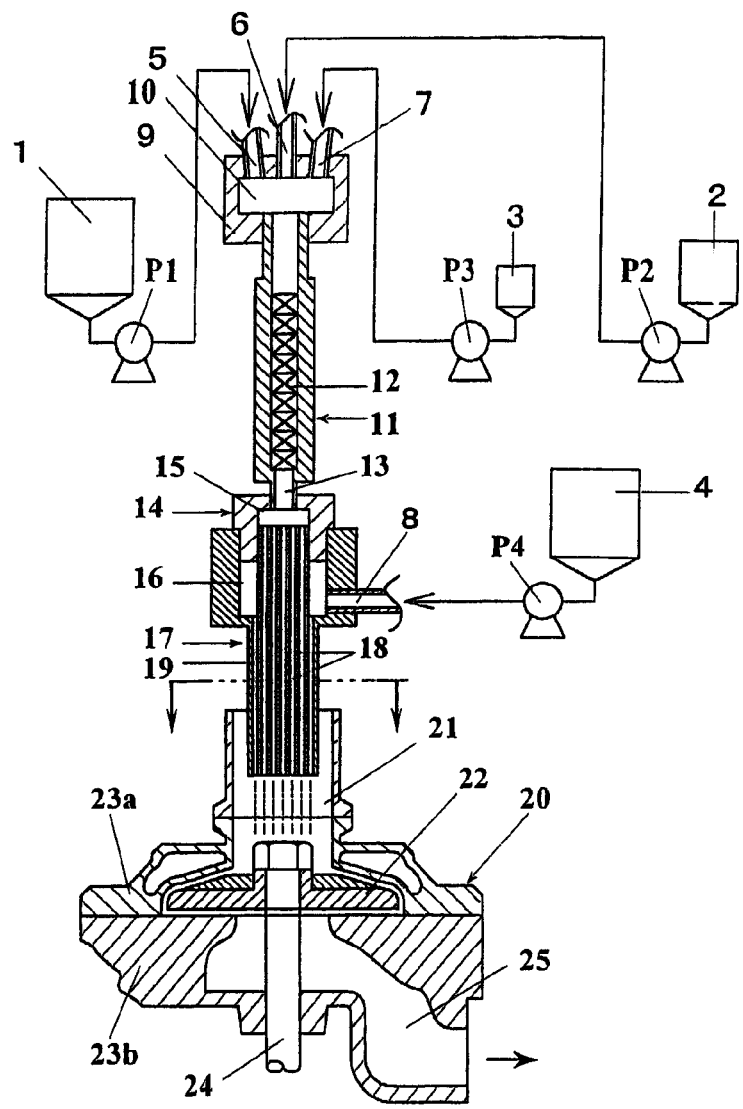
FIG. 1 is a schematic longitudinal sectional view of the apparatus for preparation of an aqueous emulsion of a liquid curable silicone composition described in the Examples of the invention.
Figure 2:
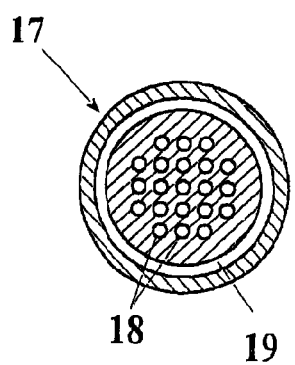
FIG. 2 is a sectional view along the line II-II of FIG. 1.

An organopolysiloxane having at least two silicon-bonded hydroxyl groups in one molecule is a main component of the curable silicone composition. In component (A), silicon-bonded hydroxyl groups are cross-linked due to a dehydration and condensation reaction with the silicon-bonded hydrogen atoms of component (B). In this case, component (C) accelerates the condensation reaction.

The aforementioned organopolysiloxane may have a linear molecular structure, a partially branched linear molecular structure, a branched molecular structure, or a net-like molecular structure. The linear molecular structure is preferable when a cured product is in the form of rubber or elastomer. It is recommended to have silicon-bonded hydroxyl groups on the molecular terminals.

Typical representatives of the aforementioned organopolysiloxane are a dimethylpolysiloxane, methylvinylpolysiloxane, or a methylphenylpolysiloxane having both molecular terminals capped with hydroxyl groups.

When component (A) has a branched or a net-like molecular structure, cured silicone particles acquire a resin-like state. Organic groups bonded to silicon atoms of such organopolysiloxane may be represented by monovalent hydrocarbon groups or by substituted monovalent hydrocarbon groups. Examples of these groups are the following: methyl groups, ethyl groups, propyl groups, butyl groups, or similar alkyl groups; vinyl groups, allyl groups, or similar alkenyl groups; phenyl groups, tolyl groups, or similar aryl groups; cyclopentyl, cyclohexyl groups, or similar cycloalkyl groups. Substituted monovalent hydrocarbon groups can be represented by benzyl groups, phenethyl groups, or similar aralkyl groups; 3-chloropropyl groups, 3,3,3-trifluoropropyl groups, pentafluoropentyl groups, or similar halogenated alkyl groups.

Components (A) with methyl groups are the least expensive. It is recommended that component (A), which have to be emulsified in water at a temperature from 0° C. to 20° C., be in a liquid state.

Organopolysiloxane (B) with at least two silicon-bonded hydrogen atoms in one molecule is used in the composition of the invention for cross-linking with the aforementioned organopolysiloxane (A) having at least two hydroxyl groups in one molecule. It is recommended that three or more silicon-bonded hydrogen atoms be present in component (B). Silicon-bonded organic groups used in this component may be the same as those mentioned with regard to component (A).

Component (B) may have a linear, a partially branched linear, branched, net-like, or a cyclic structure. The following are specific examples of component (B): a methylhydrogenpolysiloxanes having both molecular terminals capped with trimethylsiloxy groups; a copolymer of a methylhydrogensiloxane and a dimethylsiloxane having both molecular terminals capped with trimethylsiloxy groups; a copolymer of a methylhydrogensiloxane and a dimethyl siloxane having both molecular terminals capped with dimethylhydrogensiloxy groups; a methylhydrogenpolysiloxane having both molecular terminals capped with dimethylhydrogensiloxy groups; a cyclic methylhydrogenpolysiloxane; the aforementioned organopolysiloxanes in which some of the methyl groups are substituted with ethyl groups or hexyl groups; the aforementioned organopolysiloxanes in which some of the methyl groups are substituted with phenyl groups or hexyl groups; and a methyltri(dimethylsiloxy) silane.

It is recommended that in the aforementioned silicone compositions, component (B) is used in such an amount that the mole number of silicon-bonded hydrogen atoms of component (B) is equivalent to or more than the mole number of silicon-bonded hydroxyl groups of component (A).

In the composition of the invention, a ratio of component (A) to component (B) will depend on the amount of the silicon-bonded hydroxyl groups in component (A) and on the amount of the silicon-bonded hydrogen atoms in component (B), but in general it is recommended that 0.1 to 50 parts by weight of component (B) be used for each 100 parts by weight of component (A).

Curing catalyst (C) promotes a dehydration and condensation reaction between the silicon-bonded hydroxyl groups of component (A) and silicon-bonded hydrogen atoms of component (B) and causes cross-linking. Such curing catalysts may be organic tin compounds, metal salts of fatty-acid type carboxylic acids, organic titanic add esters, and platinum compounds. Organic tin compounds are preferable from the point of view of curing speed. It is also recommended to use organic tin compounds (II) with 10 or less carbon atoms, in particular, saturated fatty acid tin compounds (II) with 10 or less carbon atoms. The aforementioned organic fin catalysts can be represented by tin (II) diacetate, tin (II) bis (2-ethylhexate), tin (II) bis (neodecanate) tin, tin (II) 2,4-pentadionate, tin (II) dioctanoate, of which tin (II) dioctanoate is most preferable.

There are no special restrictions with regard to the amount in which the condensation reaction catalyst can be added to the composition, but in general it is recommended that this amount be within the range of 0.01 to 10 parts by weight, preferably 0.1 to 6 parts by weight for each 100 parts by weight of the sum of aforementioned components (A) and (B).

A surface-active agent used in the aforementioned aqueous solution of a surface-active agent (D) facilitates emulsification of the curable silicone composition in water. Such surface-active agent can be exemplified by the following compounds: alkali metal salts of higher fatty acids, sulfuric acid esters of higher alcohols, a long-chain sodium alkylsulfonate, a sodium polyoxyethylene alkylphenyl ether sulfonate, sodium alkylbenzenesulfonate, or a similar anionic surface-active agent; a long-chain alkyl quaternary ammonium salt, higher amine salt, benzyl ammonium salt, or a similar cationic surface-active agent; a polyoxyethylene alkylphenyl ether, polyoxyethylene alkyl ether, polyoxyethylene higher fatty acid ester, sorbitol fatty acid ester, glycerol higher fatty acid ester, polyoxyethylene☐propylene-modified dimethylpolysiloxane, or a similar non-ionic surface-active agent; and amphoteric surface-active agents.

Although there are no special restrictions with regard to concentration of the surface-active agent in the aqueous solution, the concentration should be sufficient for emulsification of the curable silicone composition in water.

However, the composition cannot be easily emulsified in water when concentration of the surface-active agents is too low or too high. Therefore it is recommended that the aforementioned concentration be maintained within the range of 0.5 to 50 wt. %.

If necessary, in addition to emulsification agents, the composition of the invention may contain other additives ranging from protective colloid agents to thickeners in the form of a polyvinyl alcohol, methyl cellulose, carboxymethyl cellulose, hydroxymethyl cellulose, or similar water-soluble polymers; silanes or organopolysiloxanes that contain alkoxysilyl groups, e.g., those expressed by the following formula: $Me_3SiO(Me_2SiO)_m(MeASiO)_nSiMe_3$ (where Me is methyl group, A is —$CH_2CH_2Si(OMe)_3$, m is 0 or more, and n is 1 or more); agents ranging from antimicrobial to antiseptic, antimildew agents, antioxidants anticorrosive agents, dyes, inorganic thickeners, etc.

Components (A), (B), and (C) are supplied to a continuous mixer through individual supply ports and mixed. If necessary, components (A) and (B) can be premixed and then their mixture can be supplied through an individual supply port to a continuous mixer and mixed with component (C) which is also supplied through a separate supply port. It is required that during mixing of components (A), (B), and (C) the working temperature does not exceed 10° C. Normally, all the components are stored in separate storage tank and are supplied to the continuous mixer via individual supply pipes. The supply pipes may contain pumps, e.g., gear pumps, for metered supply of the components. If during the operation the surrounding temperature exceeds 10° C., the components, especially component (A), that are used in the largest quantity, can be cooled. Cooling can be carried out, e.g., by means of heat exchangers installed in the sections of the supply pipes between the storage tanks and the continuous mixer. It is recommended that the cooling temperature do not exceed 10° C., preferably between minus 50° C. and plus 10° C., and even more preferably, between minus 30° C. and plus 5° C. In the continuous-mixing apparatus, a high mixing temperature may cause gellation or curing due to condensation reaction. A continuous mixer preferable for quick and uniform mixing of the components is a static mixer. If necessary, however, a dynamic mixer can also be used. It is recommended for the static mixer to have 5 to 50 elements and a height from 5 to 50 cm.

Each component is continuously fed to the static mixer via a respective supply port at the top of the mixer, and the resulting mixture flows down from the mixer through a discharge port located in the lower part of the mixer. The discharged mixture can be loaded together with (D) an aqueous solution of the surface-active agent to an emulsifier, e.g., to a colloid mill or an emulsifier of the type described in Kokoku No. 2001-2786 (that describes an emulsifier with supply of the raw material from above and with discharging of the resulting emulsion through the bottom, the emulsifier being provided with a horizontally arranged rotary disk having scraper blades). This apparatus carries out emulsification as water is continuously supplied. The aqueous solution of the surface-active agent (component D) is stored in a storage tank and can be cooled by means of a heat-exchanger installed in the supply tubes.

It is recommended that during mixing the environmental temperature be within the range of 5° C. to 25° C. The loaded mixture and component (D) should be mixed in a ratio suitable for emulsification, e.g., within the range from (100:20) to (100:500).

It is recommended to place a distribution device between the aforementioned continuous mixer and the colloid mill. Said distribution device may be provided with an outlet die that has orifices for discharging the mixture from the continuous mixer in the form of a plurality of threads or tapes, and a slit that surrounds said orifices for discharging the aqueous solution of the surface-active agent (component D) in the form of a film that surrounds the periphery of the aforementioned threads or tapes. The mixture discharged from the continuous mixer in the form of a plurality of threads or tapes and the aqueous solution of the surface-active agent (component D) that surrounds the threads or tapes in the form of a film continuously flow down from the distribution device to the emulsifier, e.g., a colloid mill where they are mixed together at 20° C. or less and emulsified in water to form an emulsion of a curable silicone composition. It is obvious that in order to prevent freezing of the obtained emulsion, the mixing temperature should exceed 0° C.

In order to obtain a suspension of cured silicone particles, the produced emulsion of a curable silicone composition is either retained at room temperature over a long period of time or is heated and cured for a short period of time. Removal of the water will produce cured silicone partides. The obtained silicone particles will have a spherical or a substantially spherical shape and microscopic dimensions with a volume average diameter from 1 to 50 μm.

EXAMPLE

The invention will be further described in more detail with reference to the following examples. In these examples, all values of viscosity were measured at 25° C., and the operation temperature of the environment was equal to 20° C.

Volume Average Diameter of Particles of Silicone Rubber and Emulsion

Volume average diameters of particles of silicone rubber and emulsion were measured by means of a laser-diffraction type grain distribution measurement instrument (Model LA-500 of Horiba Seisakusho Company). The volume average diameter was determined as a median diameter (i.e., a diameter corresponding to 50% of the accumulated distribution).

Example 1

Raw-material receiving chamber 10 in raw-material receiving chamber 9 [See FIG. 1] of static mixer 11 having a 21.5 cm height and containing 18 elements 12 was continuously loaded with the following components: (a) 40 mPa·s viscosity polydimethylsiloxane having both molecular terminals capped with dimethylhydroxylsiloxy groups, which was supplied from storage tank 1; (b) 20 mPa·s viscosity polymethylhydrogensiloxane having both molecular terminals capped with trimethylsiloxy groups (1.5 wt. % content of silicon-bonded hydrogen atoms), which was supplied from storage tank 2; and (c) tin (II) octanoate supplied from storage tank 3. Component (a) was supplied by gear pump P1 via pipe 5. Component (b) was supplied by mono pump P2 via supply pipe 6, and component (c) was supplied by gear pump 3 via supply pipe 7. Component (a) was cooled to 0° C. by means of a heat exchanger. Components (a), (b), and (c) were supplied in a weight ratio of 100:10:1.0. The aforementioned three components were mixed in static mixer 11 and discharged in the form of a uniform liquid mixture 13 to distribution chamber 15 of distribution device 14. From distribution chamber 15 the liquid mixture flowed down into orifices 18. At the same time, (d) 5.0 wt. % aqueous solution of a polyoxyethylene (2,6,8trimethyl-4-nonanol) ether (HLB=11.7) stored in storage tank 4 was continuously fed by mono pump P4 via supply pipe 8 to distribution chamber 16 of the distribution device 14. Component (d) flowed down through slit 19. The aforementioned liquid mixture 13 and component (d) were supplied in a 111: 92 weight ratio to colloid mill 20 via inlet port 21. In the colloid mill 20, the mixture was stirred, subjected to the action of shearing forces between rotor 22, which is fixed to rotating axis 24, rotating at a high speed and stators 23*a* and 23*b*, and turned into an aqueous emulsion of a liquid curable silicone composition. The volume average diameter of particles in the aqueous emulsion was equal to 2.02 μm. The aqueous emulsion discharge from outlet opening 25 of colloid mill 20 was heated to 70° C., whereby the liquid curable silicone composition was cured to spherical silicone rubber particles. After the water was removed in a drier, agglomerated spherical silicone rubber particles were obtained. The particles had an average volume diameter of 15.01 μm.

Example 2

Raw-material receiving chamber 10 in raw-material receiving chamber 9 (See FIG. 1) of static mixer 11 having a 21.5-cm height and containing 18 elements 12 was continuously loaded with the following components: (a) 40 mPa·s viscosity polydimethylsiloxane having both molecular terminals capped with dimethylhydroxylsiloxy groups; (e) 20 mPa·s viscosity polysiloxane of the following formula: Me$_3$SiO(Me$_2$SiO)$_7$(MeASiO)$_3$SiMe$_3$ (where Me designates methyl group and A is a —CH$_2$CH$_2$Si(OMe)$_3$) supplied from a storage tank not shown in the drawings; (b) 20 mPa·s viscosity polymethylhydrogensiloxane having both molecular terminals capped with trimethylsiloxy groups (1.5 wt. % content of silicon-bonded hydrogen atoms), which was supplied from storage tank 2; (c) tin (II) octanoate supplied from storage tank 3. Component (a) was supplied by gear pump P1 via a pipe 5. Component (b) was supplied by mono pump P2 via supply pipe 6, and component (c) was supplied by gear pump 3 via supply pipe 7. Component (e) was supplied by a gear pump via a pipe (not shown). Component (a) was cooled to 0° C. by means of a heat exchanger Components (a), (e), (b), and (c) were supplied in a weight ratio of 100:30: 20:1.5. The aforementioned four components were mixed in static mixer 11, and discharged in the form of a uniform liquid mixture 13 to distribution chamber 15 of distribution device 14. From the chamber 15 the mixture flowed down into orifices 18. At the same time, (d) 5.5 wt. % aqueous solution of polyoxyethylene nonylphenylether (HLB=13.1) stored in storage tank 4 was continuously fed by mono pump P4 via supply pipe 8 to distribution chamber 16 of the distribution device 14. Component (d) flowed down through slit 19. The aforementioned liquid mixture 13 and component (d) were supplied in a 151.5:98 weight ratio to colloid mill 20 via inlet port 21. In colloid mill 20, the mixture was stirred, subjected to the action of shearing forces between rotor 22, which is fixed to rotating axis 24, rotating at a high speed and stators 23a and 23b, and turned into an aqueous emulsion of a liquid curable silicone composition.

After 5 hours of retention at room temperature, the aqueous emulsion discharge from outlet opening 25 of colloid mill 20 was heated to 70° C., whereby the liquid curable silicone composition was cured to spherical silicone rubber particles. The product was dried in a thermal jet drier and collected by means of a cyclone and a bag filter in the form of spherical silicone rubber particles. Results of measurement of an average volume diameter for the spherical silicone rubber particles are shown in Table 1.

Example 3

The aqueous emulsion and spherical silicone rubber particles were prepared and obtained under the same conditions as in Example 2, with the exception that a weight ratio of the aforementioned mixture 13 to component (d) was 151.5:120. Results of measurement of an average volume diameter for the spherical silicone rubber partides are shown in Table 1.

Example 4

The aqueous emulsion and spherical silicone rubber particles were prepared and obtained under the same conditions as in Example 2, with the exception that component (d) comprised 5.0 wt. % aqueous solution of polyoxyethylene nonylphenylether (HLB=13.1) and that a weight ratio of the aforementioned mixture 13 to component (d) was 151.5:120. Results of measurement of an average volume diameter for the spherical silicone rubber partides are shown in Table 1.

TABLE 1

|  | Example 2 | Example 3 | Example 4 |
|---|---|---|---|
| Concentration of surface-active agent in aqueous solution (wt. %) | 5.5 | 5.5 | 5.0 |
| Content of the aqueous solution of surface-active agent (parts by weight) | 98 | 120 | 120 |
| Volume average diameter of the particles (μm) |  |  |  |
| Emulsion particles | 2.19 | 2.33 | 2.58 |
| Silicons rubber particles | 2.23 | 2.38 | 2.63 |

INDUSTRIAL APPLICABILITY

According to the method of the present invention, a uniform aqueous emulsion and a uniform suspension of cured silicone particles can be efficiently produced substantially without gellation or partial curing due to condensation reaction of the polysiloxane component of a silicone composition curable by dehydration and condensation reaction prior to emulsification in water. The apparatus of the present invention is extremely efficient in the production of a uniform aqueous emulsion substantially without gellation or partial curing due to condensation reaction of the polysiloxane component of a silicone composition curable by dehydration and condensation reaction prior to emulsification in water.

What is claimed is:

1. An apparatus for preparation of an aqueous emulsion from a curable silicone composition, said apparatus comprising:
   a continuous mixer for mixing (A) an organopolysiloxane having at least two silicon-bonded hydroxyl groups in one molecule, (B) an organohydrogensiloxane having at least two silicon-bonded hydrogen atoms in one molecule, and (C) a curing catalyst;
   a distribution device, which is connected to said continuous mixer from below; and comprises an outlet die having orifices for discharging the liquid mixture of components (A), (B) and (C) from said continuous mixer in the form of threads or tapes flowing down through said orifices, and a slit for discharging (D) an aqueous solution of a surface-active agent; and
   an emulsifier connected from below to said outlet die of said distribution device.

2. The apparatus for preparation of the aqueous emulsion as claimed in claim 1, wherein said continuous mixer is a static mixer.

3. The apparatus for preparation of the aqueous emulsion as claimed in claim 2, wherein said emulsifier is a colloid mill.

4. The apparatus for preparation of the aqueous emulsion as claimed in claim 1, wherein said emulsifier is a colloid mill.

* * * * *